(12) United States Patent
Tyler, III et al.

(10) Patent No.: US 7,063,867 B2
(45) Date of Patent: Jun. 20, 2006

(54) PROCESS FOR ENHANCED FLAVORING OF BEVERAGES AND PRODUCT PRODUCED THEREFROM

(76) Inventors: Orville Z. Tyler, III, 21 Prescient St., Mount Pleasant, SC (US) 29464; Edward W. Bailey, 6852 McCants Rd., Wadamalaw Island, SC (US) 29487

( * ) Notice: Subject to any disclaimer, the term of this patent is extended or adjusted under 35 U.S.C. 154(b) by 268 days.

(21) Appl. No.: 10/234,973

(22) Filed: Sep. 4, 2002

(65) Prior Publication Data

US 2003/0110951 A1 Jun. 19, 2003

Related U.S. Application Data

(60) Provisional application No. 60/316,997, filed on Sep. 4, 2001.

(51) Int. Cl.
*C12H 1/06* (2006.01)

(52) U.S. Cl. .................. 426/237; 426/247; 426/592
(58) Field of Classification Search ................. 426/237, 426/247, 592, 238
See application file for complete search history.

(56) References Cited

U.S. PATENT DOCUMENTS

| | | | |
|---|---|---|---|
| 4,173,656 A | 11/1979 | Duggins | |
| 4,210,676 A | 7/1980 | Dudar et al. | |
| 4,576,824 A | 3/1986 | Gubiev et al. | |
| 4,956,194 A | 9/1990 | Gos | |
| 4,994,289 A | 2/1991 | Yu | |
| 5,102,675 A | 4/1992 | Howell et al. | |
| 5,173,318 A | 12/1992 | Leu et al. | |

FOREIGN PATENT DOCUMENTS

| | | |
|---|---|---|
| CH | 276400 | 7/1951 |
| DE | 846395 | 8/1952 |
| DE | 119614 | 5/1976 |
| EP | 0336262 A1 | 10/1989 |
| EP | 0860498 A1 | 8/1998 |
| EP | 10137552 A2 | 6/2000 |
| JP | 56068385 * | 6/1981 |

OTHER PUBLICATIONS

PCT Search Report, Dec. 17, 2002.
Abstract of Japanese Patent 56068385, Jun. 9, 1981.
Am. J. Enol. Vitic., vol. 45, No. 1, 1995, "Maturation of Wines and Spirits: Comparisons, Facts, and Hypotheses," Vernon L. Singleton, pp. 98–115.
Am. J. Enol. Vitic, vol. 47, No. 4, 1996, "Influence of Wood Heat Treatment, Temperature and Maceration Time on Vanillin, Syringaldehyde, and Gallic Acid Contents in Oak Wood and Wine Spirit Mixtures," R. Gimenez Martinex, H. Lopez Garcia De La Derrana, M. Villalon Mir, J. Quesada Granados, and M. C. Lopez Martinez, pp. 441–446.
Laid Open Japanese Patent Application Publication for S56–68385, Mitsuru Sakai, Jun. 9, 1981.
Abstract of Japanese Patent No. JP0926083 Oct. 7, 1997.
Abstract of Japanese Patent No. JP10057045 Mar. 3, 1998.
Abstract of Japanese Patent No. JP62022585 Jan. 30, 1987.
European Search Report Dec. 8, 2004.

* cited by examiner

*Primary Examiner*—Curtis E. Sherrer
(74) *Attorney, Agent, or Firm*—Dority & Manning, P.A.

(57) ABSTRACT

The present invention is directed to a process for rapidly aging alcoholic beverages and to the beverages produced by the process. During the process, a consumable alcoholic feedstock is contacted with ultrasonic energy at a power of at least about 3 Watts/liter. If desired, a variety of flavorants can also be contacted with the alcohol and ultrasonic energy in order to flavor the beverage. The energy can push the maturation chemistry of the alcohol to completion quickly and produce a consumable product which is unique in characterization and can have flavor and smoothness surpassing that of consumable alcohols aged in slower, more traditional processes.

45 Claims, 2 Drawing Sheets

US 7,063,867 B2

PROCESS FOR ENHANCED FLAVORING OF BEVERAGES AND PRODUCT PRODUCED THEREFROM

CROSS REFERENCE TO THE RELATED APPLICATION

This application claims priority to an earlier filed U.S. provisional patent application Ser. No. 60/316,997 filed Sep. 4, 2001 entitled, "Process and Product for Enhanced Flavoring of Beverages."

FIELD OF THE INVENTION

The present invention is generally directed to a beverage product and to a process for producing beverages. More particularly, the present invention is directed to a process for flavoring and/or rapidly aging alcoholic beverages, such as distilled spirits, that results in a unique product that has improved smoothness, end depth of aroma and taste. In general, the process includes the step of subjecting a liquid, such as an extract or an alcoholic beverage, to ultrasonic energy and, in some embodiments, to various flavorants.

BACKGROUND OF THE INVENTION

Alcoholic beverages, such as vodka, tequila, rum, bourbon, scotch, brandy and the like are generally produced through a distillation process. Once produced, in order to improve the taste and smoothness of the beverage, many products are aged. For instance, bourbons and scotches are typically aged at least three years prior to being sold for consumption. Rums, tequilas and brandies are aged for varying amounts from 2 to 10 years or even more.

In the past, alcoholic distillates, such as bourbon and scotch, for example, have been aged in oak barrels or casks over tong periods of time. The beverages are aged in the wooden containers in order to remove unwanted components and to impart certain colors, flavors and fragrances to enhance the smoothness and taste of the beverage. During the aging process, the distillates can react with components in the wood, such as lignins, tannins, and carbohydrates. Distillation and aging techniques have changed little over the last several hundred years.

Unfortunately, the costs of conventional aging processes are enormous, often accounting for half to two-thirds or even more of the cost of the spirit to consumers. For instance, to ensure product quality, the oak barrels should be stored in warehouses under carefully controlled temperature and humidity conditions for very long periods of time. The barrels are not only very expensive to manufacture but also take up a significant amount of space. Further, much of the alcoholic product can be lost during aging due to evaporation through the pores of the barrels.

In addition, natural barrel aging, though providing the best method to date for enhancing and improving the flavor of spirits, also presents limitations to the chemical reactions which are believed to improve spirit flavor and quality. For instance, oxidation and esterification reactions which are believed to assure spirit smoothness and flavor tend to be inefficient and unable to proceed to completeness at the temperatures which are preferred for limiting loss of product due to evaporation. Thus a balance must be struck with aging processes between increased temperature in order to promote desired chemical reactions and lower temperature desired to limit product evaporation.

Due to the above deficiencies and disadvantages associated with conventional aging processes, those skilled in the art have attempted to devise processes for rapidly aging alcoholic distillates. For example, the use of oak chips and/or oak concentrates is common practice in the industry in attempting to rapidly age alcoholic distillates. For instance, U.S. Pat. No. 4,210,676 to Dudar, et al., which is incorporated herein by reference as to all relevant matter, is directed to a process and apparatus for the acceleration of the ripening of spirits. According to Dudar, et al., distilled spirits are irradiated with ultrasonic radiation in the presence of wood staves. Specifically, the '676 patent teaches applying ultrasonic energy in an amount of 1.7 Watts per liter of alcohol.

Although the prior art has attempted to devise rapid aging processes for distilled spirits, to date no process has gained any real commercial importance. As such, a need exists for a process capable of rapidly aging alcoholic beverages which can not only provide a consumable beverage equivalent to traditionally aged products in taste, aroma, smoothness, color, as well as other characteristics, but can even improve upon these qualities through more complete reaction of the beneficial chemistry involved in the aging process.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying figures, in which.

SUMMARY OF THE INVENTION

Figure 1:
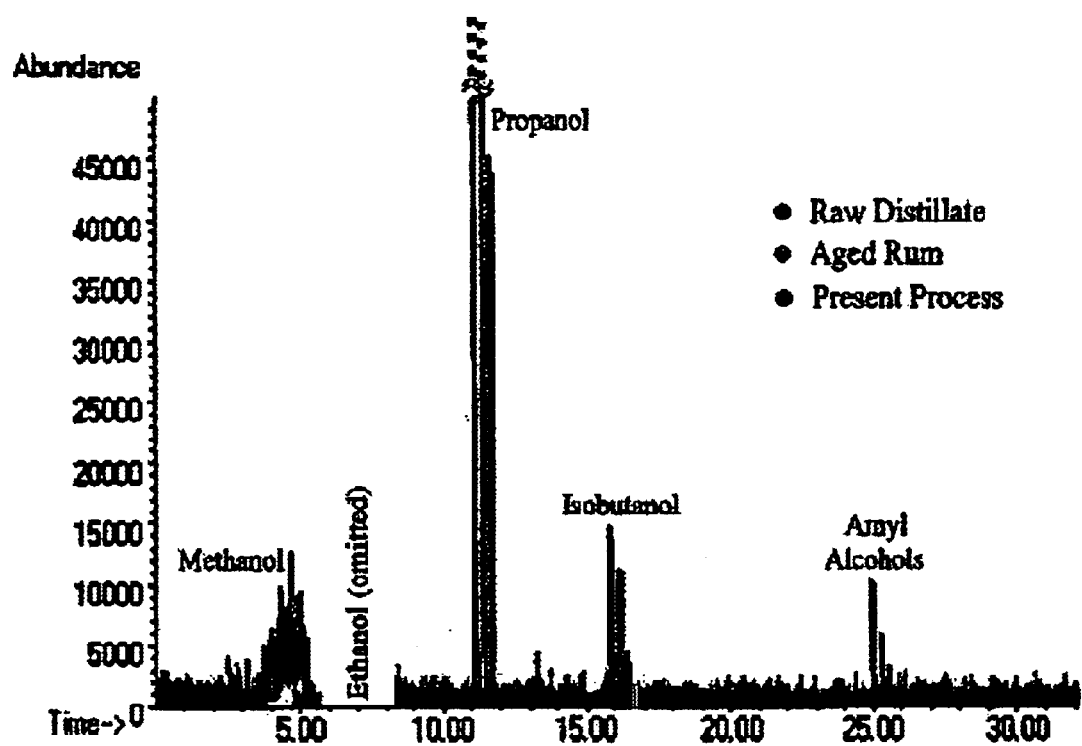
FIG. 1 graphically illustrates the presence of higher alcohols in raw distallate, commercial distillate aged two years, and an exemplary product formed according to the presently disclosed process.

In one embodiment, the present invention is directed to a process for maturing alcoholic beverages. In general, the process includes subjecting a distilled consumable alcohol to ultrasonic energy at at least about 3 Watts/liter for a time sufficient to after the chemical properties of the alcohol.

Any alcohol can be matured through the present process. For example, the alcohol can have an alcohol content between about 20 proof and about 190 proof. In one embodiment, the alcohol can have an alcohol content between about 80 and about 150 proof.

In one embodiment, the alcohol can be recirculated through the reaction vessel where it is contacted with ultrasonic energy.

In certain embodiments, the ultrasonic energy can be at a power of at least about 5 Watts/liter, more specifically between about 10 and about 80 Watts/liter. Moreover, the ultrasonic energy can be at a frequency of greater than about 20,000 Hz, more specifically between about 20,000 and about 170,000 Hz in one embodiment, the ultrasonic energy can be at a frequency greater than about 35,000 Hz, for instance, in one embodiment, the ultrasonic energy can be at a frequency of about 80,000 Hz.

The alcohol can generally be at a temperature of between about 70° F. and about 150° F. during the process of the present invention. In one embodiment, the alcohol can be at a temperature between about 90° F. and about 120° F. during the process.

In one embodiment, the alcohol car be contacted with a purifying agent before, during, and/or after the present process. For instance, the alcohol can be contacted with activated carbon, diatomaceous earth, a filter, or a combination of purifying elements. For instance, a filter having an average pore size of less than about 5 µm can be used either alone or with other purifying agents to purify the alcohol.

The amount of time the alcohol is contacted with the ultrasonic energy can vary depending on process conditions and desired product. Generally, the alcohol can be contacted with the ultrasonic energy for at least about one hour. In one embodiment, the alcohol can be contacted with the ultrasonic energy for between about 12 and about 36 hours.

In one embodiment, the alcohol can have flavorings added during the process. For example, the alcohol can be contacted with a desired flavorant and subjected to ultrasonic energy. Examples of possible flavorants can include wood, seeds, fruitwoods, nuts, fruits, plants, vegetables, or mixtures of flavors. If the flavorant is a solid, the flavorant can be filtered from the beverage after the alcohol has been subjected to the ultrasonic energy. In one embodiment, the alcohol can be contacted with additional ultrasonic energy after removal of the solid flavorant from the alcohol.

A flavorant can be added either before contact with any ultrasonic energy or after, as desired. If the flavorant is added after the initial ultrasonic energy contact, additional ultrasonic energy contact can be established. For instance the alcohol can be contacted with ultrasonic energy, a flavorant can be added, and the flavorant/alcohol mixture can again be contacted with ultrasonic energy. In one embodiment, the flavorant/alcohol mixture can be contacted with additional ultrasonic energy for a period of between about 2 and about 4 hours.

If desired, a grain alcohol can be matured and/or flavored through the present process, though when maturing a grain alcohol, a catalyst should be added to the alcohol prior to contacting the alcohol with the ultrasonic energy. For instance, a sugar, an organic acid, an ester, a wood extract, or a combination of catalysts can be added to the grain alcohol prior to subjecting the alcohol to ultrasonic energy.

The product produced by the present process can be matured very quickly, for example in about thirty days or less, and can have unique characteristics. For example, the alcoholic product produced by the process of the present invention can include certain congeners in an amount only found in distilled beverage products aged for years in oak. For example, the product of the present invention, though not aged for more than about three years in an oaken barrel, can include vanillin in an amount greater than about 4.0 mg/L and syringaldehyde in an amount greater than about 8.0 mg/L. Other, less desirable congeners can be found in smaller quantities in the products produced by the present process when compared to other products. For example, the alcoholic product of the present invention can have about 20% less amyl alcohols than a similar product which has not been subjected to ultrasonic energy.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention generally relates to a process for improving the taste and smoothness of alcoholic beverages, and particularly distilled alcoholic beverages, in order to obtain maximum palatability. The process of the present invention can be used to flavor alcoholic beverages and also can be used to rapidly age alcoholic beverages.

In the past, conventional methods for aging fermented and distilled spirits included placing the beverages for many years in wooden, usually oak, casks in order to rid the beverage of unwanted components and to impart certain colors, flavors and fragrances that enhance the smoothness and taste of the beverage. The process of the present invention can produce beverages with similar and even improved characteristics over conventionally aged beverages in a fraction of the time.

In general, the present invention is directed to a process during which desirable elements are added and undesirable elements are removed from a distilled alcoholic composition such as through interaction and/or chemical reaction between the components already present in the composition or through reaction with components added to the composition. In any case, and for at least a portion of the process, the composition is contacted with ultrasonic energy. The process is designed to produce an alcoholic product having enhanced beverage characteristics, even under less than ideal conditions, with less than perfect mixes and/or with less than ideal feed stock beverages.

The alcoholic products that can be produced according to the present invention include not only products to be directly consumed, but also alcoholic products which can be used as extracts. For instance, an alcoholic beverage can be flavored with various flavorants and used as an extract. Such flavorants can include, for instance, nuts and herbs as will be described in more detail hereinafter.

The process of the present invention offers various advantages and benefits over conventional processes. For instance, mature alcoholic beverages can be produced within a matter of hours or days as opposed to the several years many aging processes require. During the process of the present invention, much less alcohol feed stock is lost due to evaporation in comparison to conventional aging methods. Further, the process of the present invention can produce flavor in beverages while requiring far less flavorants, for example, less raw wood, while producing the same quality of flavor as other flavoring processes.

The process of the present invention is economical and does not require a substantial amount of labor or equipment. The process of the present invention is also easily controllable for producing beverages with uniform characteristics. The process can be configured either as a continuous process or as a batch process, as desired. Finally, it is believed that the product produced by the process of the present invention is unique and has many improved characteristics in comparison to many commercial products that are currently on the market, including traditionally aged products.

The process of the present invention begins by first selecting an alcohol feed stock. In general, any distilled or high proof consumable alcohol may be used in the process including alcohols produced by a continuous or batch process. For instance, 20 proof to about 190 proof distillates may be used. In one embodiment, the distillate selected can have a proof of from about 80 to about 150.

A non-exhaustive list of examples of alcohols that may be used in the process of the present invention include vodka, tequila, rum, brandy, bourbon, scotch, rye, and spirits made from combinations of grains, or grains and other fermentable fruits and vegetables. Further, the alcohol used in the process can first be partially aged through other aging methods or can be provided directly to the present process from the distilling operation.

When incorporated into the process of the present invention, the alcoholic beverage can be used as is or can be mixed with other ingredients. For instance, optionally, a catalyst or a flavorant can be added to the alcohol feed stock in order to initiate and speed up the process or in order to otherwise enhance various characteristics of the alcohol.

Distilled consumable alcohols are herein defined as those consumable alcoholic products which include ethanol and water as well as other chemical components. These alcohol feed stocks can be used as is in the processes of the present invention, and additives, such as catalysts or flavorants, while optional, are not required. In contrast, grain alcohols, such as Everclear™, for example, will require an added catalyst prior to processing according to the present invention. For example, in one embodiment, grain alcohol can be mixed with a distilled consumable alcohol prior to being processed according to the present invention. Alternatively, a grain alcohol can be mixed prior to processing according to the present invention with an additive which can provide the desired catalytic activity. In general, a catalyst additive should have a polar charge and should be soluble in the alcohol.

Examples of additives that may be used in the present invention include sugars, such as corn sugar, sugar cane, fructose, glucose, caramels and the like; esters, such as flavorant oils and extracts including, for example a peppermint extract, a walnut extract, and the like; weak acids, such as citric acid; aldehydes; phenols, such as wood extracts and salts of the above. Such additives, which are only exemplified in this particular listing, may be used as catalysts for the process, such as when a grain alcohol is processed, or may be utilized as additives to enhance a distilled consumable alcohol which does not require any catalyst for the process. For example, an additive can enhance color, flavor, aroma, and/or smoothness of the beverage.

In one embodiment of the present invention, a sugar can be used as a catalyst in the process. If necessary, and depending upon the composition of the alcohol feed stock, a sugar can be added to the alcohol feed stock so that the alcohol has a total sugar concentration of up to about 2%, and particularly at a level of about 1%. It should be understood that the actual amount of the catalyst added will depend upon the particular alcohol. In some processes the catalyst can be added to make the sugar concentration greater than 2% such as up to about 5%. In some processes, however, no sugar is added.

In order to improve the taste and other characteristics of the alcohol feed stock in accordance with the present invention, the alcohol is subjected to ultrasonic energy. In one embodiment, the alcohol can be subjected to ultrasonic energy in the presence of various flavorants, though this is not required, to further enhance the beverage.

The process of the present invention can be performed in either a batch or continuous operation. For descriptive purposes only, the process has been divided into three separate stages, only the first of which is required by the present process. It should be understood, however, that the 'stages' described need not be carried out separately, and can all be combined in one continuous process operation.

The alcoholic beverages of the present invention can be improved by processing via only the first stage, the first and second stage, or via all three stages, depending upon the particular application and the desired results. The following is a detailed description of each stage that may occur during the process.

Stage I

In Stage I, the alcoholic feed stock is placed in a vessel and subjected to ultrasonic energy. If desired, a catalyst can be added to the alcoholic feed stock, though, as previously discussed, a catalyst is required only with grain alcohol feed stocks. In one embodiment, the alcohol can be recirculated through the vessel during this stage. During this stage, which can be a stand alone process, the smoothness and flavor of the alcoholic feed stock can be significantly improved.

One important aspect of the present invention is the amount of ultrasonic energy that is used during the process. For instance, for most applications, the amount of ultrasonic energy to which the alcohol is subjected should be at least 3 Watts per liter and particularly at least 5 Watts per liter. More particularly, the amount of ultrasonic energy can range from about 10 Watts per liter to about 80 Watts per liter. In one embodiment, the amount of ultrasonic energy can range from about 15 Watts per liter to about 40 Watts per liter.

At the above energy levels, the beverage can be sonicated at various ultrasonic frequencies without limitation. For instance, the beverage can be sonicated at a frequency of at least 20,000 Hz (the base frequency for ultrasonic energy) and particularly at a frequency of from about 20,000 Hz to about 170,000 Hz. In one embodiment, the alcohol can be sonicated at a frequency of greater than about 35,000 Hz. For example, the alcohol can be sonicated at a frequency of about 80,000 Hz. At the above energy levels and frequencies, the ultrasonic energy can cause the alcohol to undergo cavitation. As used herein, cavitation refers to a process wherein any bubbles that form in the liquid are abruptly smashed by the ultrasonic energy.

Due to being subjected to the ultrasonic energy, the temperature of the alcohol can increase. It is believed that this is a beneficial side effect in that preferably the temperature of the alcohol can be maintained between about 90° F. and about 120° F. during the process. If necessary, a cooling device can be placed in association with the vessel during the process in order to prevent the alcohol from becoming too hot. For example, the alcohol generally should not exceed about 150° F. during the process of the present invention. Similarly, if the temperature of the alcohol drops below about 70° F., not all of the desired chemistry can take place, and the product beverage may not be improved as much as desired. Though these exemplary temperatures may be preferred in some embodiments, it should be understood that they are not strictly required according to the process of the present invention. In certain embodiments, the present process can be effective at temperatures below 70° F. or above 150° F. It is believed that a temperature range of from about 90° F. to about 120° F. is one possible range acceptable to promote the chemical and/or physical transformations that occur in the alcohol.

In one embodiment, while being subjected to ultrasonic energy, the beverage can also be circulated to and from the reactor vessel. Circulating the beverage can distribute the ultrasonic energy more evenly and can produce a more uniform product.

The size of the reactor vessel that is used can vary depending upon the particular process and is generally not critical. It is believed that the present process can be developed for a reactor vessel of any desired size. For example, the present process can be designed for a small, home-use type of process, with a relatively small, batch type design, or alternatively can be sized for any large scale, continuous alcoholic beverage production facility.

In one embodiment, during this stage of the process, the alcohol can be brought into contact with various purifying elements in order to remove undesirable impurities contained within the alcohol. Such purifying elements can include, for instance, activated charcoal, physical filtering elements, including those with filtration pores of an average diameter down to the micron scale, and/or diatomaceous earth. The purifying elements can be placed directly into the alcohol and removed by filtration or can be placed into a filter element through which the alcohol is directed. In a further embodiment, the purifying elements can be placed in the vapor space above the beverage as it is being subjected to ultrasonic energy. In addition to removing impurities, the purifying elements can also improve the color and clarity of the product. One embodiment of the present invention uses filtration elements in series with both mineral and fiber filtration processes.

The amount of time Stage I of the process requires can depend upon the particular application, the alcohol selected, whether or not a catalyst is used, as well as various other factors. In general, the alcohol can be subjected to ultrasonic energy in this stage for at least about 1 hour. Longer times, however, such as from about 18 to about 38 hours, may be preferred depending on, for example, the level of impurities in the alcoholic feed stock, or how far to completion it is desired to go in certain flavor enhancing chemical reactions. In one embodiment, the alcoholic feed stock can be subjected to ultrasonic energy in this stage for between about 12 and about 18 hours.

Although not wishing to be bound by theory, it is believed that the ultrasonic energy modifies the structure of the alcoholic beverage. In particular, the alcoholic feed stock contains water molecules. It is believed that the ultrasonic energy causes intimate contact and coordination between the water and alcohol. It is further believed that when the water molecules become laced with the alcohol molecules, the smoothness and flavor of the resulting product is greatly enhanced.

As stated above, after Stage I, for many alcoholic beverages, no further processing is desired and the product is ready to be marketed and consumed. Vodka, tequila and rum are typical examples of alcoholic feed stocks which can reach desired product quality levels after being processed according to the present invention via Stage I only.

Stage II

In addition to the smoothness of the alcoholic beverage being improved in Stage I, if desired, the alcohol can be processed further through a second and, if desired, a third stage. The purpose of Stage II is to impart flavor into the alcohol through intimate contact with flavorants, such as natural ingredients. Stage II can occur simultaneously with Stage I or optionally, can follow completion of Stage I processing.

As previously stated, it is believed that by being subjected to ultrasonic energy, the water and alcohol in the feed stock can become intimately coordinated. It is further believed that this process can prepare sites for bonding between constituents in the liquid and other additives. As such, other product enhancing additions to the beverage can be readily and rapidly integrated with the liquid following, or at the same time, as the sonication of Stage 1 occurs.

For instance, at this stage in the process, the alcohol can be contacted with flavorants that imitate flavoring which occurs over time in wooden containers. For example, in one embodiment, a mixture of wood particles obtained from one or more sources can be combined with the alcohol. The wood particles should be appropriately sized, for example the size of standard wood chips, so that the alcoholic beverage can remain in intimate contact with the wood. The wood particles can be obtained from different wood types such as hardwoods including, for example, oak and maple. The wood particles can also have treated surfaces such as by toasting or charring, by adding flavor or fragrance elements to the surface of the wood, or by using wood particles that have previously been used to age alcohols.

In addition to or alternatively to wood particles, other flavorants can be added to the alcohol in accordance with the present invention. For instance, in addition to producing alcohols with characteristics similar to traditionally aged products, the process of the present invention can be used to produce flavored alcohols, such as berry flavored alcohols, citrus alcohols, nut flavored alcohols, and the like.

A nonexhaustive list of flavorants and additives that may be used in the process of the present invention include the following:

| | |
|---|---|
| Seeds: | caraway, anise, sesame, etc. |
| Woods: | oak (in any of its various species); beech; maple (hard, soft, sugar); birch; teak (wood flavorants include versions of the same wood that have been toasted to varying degrees, charred or charcoaled) |
| Fruitwoods: | pecan, apple, peach, pear, apricot, cherry, walnut |
| Nuts: | pecan, walnut, almond, cashew, hazelnut, macadamia, coconut |
| Fruits: | apricot, apple, cherry, citrus (lemon, lime, grapefruit, tangerine, tangelo, cumquat, etc.); grape, raisin, mango, pineapple, plum |
| Plants: | mints, vanilla, cinnamon, cocoa, peppers, all herbs |
| Vegetables: | artichoke, celery, etc. |

The amount of flavorants added to the alcohol can depend upon the particular application. In general, flavorants can be added up to about 5 ounces per liter of alcohol, particularly flavorants can be added in a range of about 0.2 to about 2.5 ounces per liter of alcohol. In one embodiment, flavorants can be added in a range of from about 1.0 to about 1.5 ounces per liter. More or less flavorants can optionally be used however.

As shown above, the process of the present invention is capable of using natural ingredients rather than using extracts, although extracts or concentrates may optionally be used in the process. Further, it should be understood that the particular flavorants used in any particular process will depend upon the product that is being produced. Consequently, a single flavorant or a mixture of flavorants may be combined as appropriate.

During this stage of the process, after the flavorants have been combined with the alcohol, the alcohol can continue to be subjected to ultrasonic energy at the frequencies and energy levels as described above. Further, the alcohol can be recirculated during the process, as previously described. Recirculation combined with the ultrasonic energy can cause the flavor of the alcohol to more rapidly be changed.

During this stage, when flavorants are present, the process can be both heat sensitive and time sensitive. As described above, due to the ultrasonic energy, the alcohol can naturally increase in temperature. When the flavorants are present, the temperature should be maintained below about 150° F., particularly between about 70° F. and about 150° F. In one embodiment, the temperature can be maintained between about 100° F. and about 120° F.

The amount of time the flavorants stay in contact with the alcohol under ultrasonic agitation will depend upon the process conditions. When Stage II is separate from and follows the completion of Stage I, this stage of the process can usually last between about 2 hours and about 4 hours.

When this stage is combined with Stage I, however, the flavorants can stay in contact with the alcohol for a period of time equivalent to that described above for Stage I alone. In other words, when Stage I and Stage II are combined, sonication can be carried out for a period of time equivalent to when Stage I is carried out alone, when no flavoring additives have been included in the feedstock. Exposing the alcohol to the flavorants for an overly extended period of time should be avoided, as it can allow undesirable flavors to develop in the liquid product.

In those embodiments wherein the flavorants are in solid form, i.e. dried or fresh flavorants as opposed to liquid extracts or concentrates added to the alcohol, after the alcohol and flavorants have been mixed and subjected to ultrasonic energy for a predetermined amount of time, the solid flavorants can then be filtered from the mixture. Any suitable filter may be used for this purpose. For instance, a micron sized fabric filter may be used. The mixture may also be cold filtered.

Ultimately, this stage of the process can impart flavor to the alcoholic beverage and can improve its color and aroma. Further, it has been discovered that by selecting various combination of flavorants, not only are desirable flavors enhanced, but undesirable flavors can be masked and the causative undesirable flavorants can be reduced in amount.

Stage III

In Stage III of the process of the present invention, which is optional after any solid flavorants of Stage II have been removed, ultrasonic agitation of the alcohol can be continued along with optional recirculation. In this stage, the ultrasonic energy can mesh and bond the flavors into the alcohol.

In particular, during this stage of the process, the ultrasonic energy can be applied to the alcohol at the same frequencies and energy levels as described above. Further, the temperature of the beverage should remain within the same range as described with respect to Stage II of the process. Stage III is not time dependent, but for most applications, can last from about 30 minutes to about 6 hours. Longer times may be used if desired. During this part of the process, the beverage can also be further filtered in order to ensure that no particulate material remains in the liquid, as well as to improve clarity to commercial standards. Alternatively or in addition to filtering the beverage during Stage III of the process, the beverage can be filtered after sonication has ceased.

By continuing ultrasonic agitation after removing any solid flavorants, it is believed that the flavors can become more permanently associated with the beverage.

In combination with the present process, other known processing techniques can be included in formation of the desired beverage. For example, other existing commercial processes such as microoxidation, recirculation in oxygen enhanced or deprived conditions, coloration, polish filtration, or inclusion of other additives to the product may be incorporated into the present process. Such known processes can be incorporated with the present invention to achieve specific desired effects in the product beverage, for example desired flavors or colors associated with maximum aged brands of alcoholic beverages, i.e. those aged for up to 25 years prior to consumption. Additional processing can occur before, during, or following the process of the present invention depending on a wide variety of factors such as, for instance, the quality of the incoming distillate, the flavor, clarity, or aroma desired in the product, and the like.

It has been discovered that the flavor of the alcohols produced by the present process will not decay over time, even under unfavorable storage conditions such as warehouse storage at approximately 120° F. This has been found to be the case not only for those flavors natural to traditionally aged alcoholic beverages, for example, the natural bourbon, gin, rum, brandy, etc. flavors, but also for flavors which have been added to the beverage. For example, citrus flavors can be added to an alcoholic beverage, such as vodka; and certain flower flavors can be associated with spiced rums and/or scotch liquors. Such flavored alcohols, when processed via the present invention, can retain the added flavor better and for a longer time than can flavored alcohols processed according to other maturation and flavoring processes. Further, this process can lace the flavors together and can provide a fuller flavor. It has also been discovered that the clarity of the beverage can also be improved through the process of the present invention.

Through the above one to three stage process, various consumable alcoholic beverages can be produced, all with improved smoothness characteristics. Besides smoothness, the present invention can also be used to improve color, clarity, aroma and taste. In fact, it is believed that the process of the present invention generates a fundamentally different product than conventionally made distilled spirits, whether aged or not. As described above, it is believed that the process can produce a beverage having a unique structure formed between the alcohol and any water present in the beverage.

For example, it has been discovered that an alcoholic beverage produced according to the process of the present invention can have unique pH, conductance, gas chromatograph/mass spectrophotometer, viscosity and/or filtration properties.

It should also be understood that the characteristics of the products produced by the present invention are permanent and will not degrade over time. In fact, it has been discovered that not only are the characteristics of the products produced by the present invention resilient and do not substantially decay, but the product characteristics actually continue to improve over time, suggesting that a permanent physical and/or chemical transformation occurs through the processes of the present invention, and an improved alcoholic beverage can be produced.

The combination of fermentation, distillation and maturation in traditionally aged products is known to produce hundreds of chemical compounds in the final product. Even though they may be present only in parts per million, the sensitive human palate can detect many of these compounds. Taken collectively, these trace compounds are known as congeners, and they include, among others, aldehydes, esters and primary alcohols. While congeners are necessary and desirable for distinguishing one brand from another, many of these compounds are undesirable, yet unavoidable artifacts of the production process.

One of the more widely known classes of congeners is the higher alcohols, sometimes called fusel oils. In general, the compounds in this group are a mixture of volatile, oily liquids with a disagreeable odor and taste. And taken in sufficient quantities, they can be dangerously toxic to humans.

As a rule, neutral spirits generally have fewer congeners than darker spirits, and research has shown that beverages composed of more pure ethanol, such as gin or vodka, may induce fewer hangover effects than do beverages containing a large number of congeners, such as bourbon or brandy. Through the process of the present invention, alcoholic beverages, such as rum, for instance, can be produced with reduced levels of certain congeners. Specifically, the alcoholic beverages produced by the process of the present invention can have reduced levels of undesired higher alcohol congeners such as amyl alcohols, isobutanol, and propanol, for example, in the final product as compared to slower aged, similar products. It is believed that such improvements are due to improved efficiency and control of a variety of the chemical reactions involved in the maturation of flavor enhancement of alcoholic beverages.

As previously mentioned, there are believed to be hundreds of different compounds affecting the characteristics of aged alcoholic beverages, however, there are believed to be five aromatic aldehydes, eight phenols, six carbohydrates and half a dozen oxidation products or minor extractives that make up the major flavor components in barrel aged spirits. (SINGLETON, V. L. "Maturation of Wines And Spirits: Comparisons, Facts and Hypotheses", Am. J. Enol. Vitic. 25(1):98–115, 1995.)

During traditional maturation processes in oaken barrels, many of the components in the beverage which are extracted from the wooden containers will undergo oxidation/ethoxylation reactions, with an increasing proportion of the extracts being converted over the course of the aging process into smoother tasting esters, such as vanillin, or other acidic reaction products such as ellagic acid, gallic acid, and syringaldehyde, for example. Thus, aged alcoholic beverages can have increasingly higher levels of some extracts over time, such as phenols, for example. Other extracts, those subject to oxidation/ethoxylation reaction, can have levels that peak after a time and then begin to decline as the extracts are converted. Additionally, the level of the reaction products in the alcohol will increase proportionally as the reactant extract levels decrease. The net result of the aging process will therefore tend to decrease pH of the beverage over the near term of the aging process due to both the increased amount of the acidic extracts and the increased amount of the oxidation/ethoxylation reaction products in the beverage.

Typical levels (shown in mg/L) of ellagitannin extracts and related oxidation/ethoxylation reaction products over time for oak aged alcoholic cognacs are as follows:

|  | 1 year | 10 years | 30 years |
| --- | --- | --- | --- |
| Ellagitannins | 10 | 31 | 4 |
| Ellagic acid | 7 | 32 | 55 |
| Gallic acid | 3 | 22 | 26 |
| Vanillin | 0.6 | 5.8 | 7.2 |
| Syringaldehyde | 1.1 | 10.9 | 14.2 |
| Vanillic acid | 0.9 | 3.1 | 5.4 |
| Syringic acid | 0.8 | 4.0 | 6.4 |

Though these values are specific to cognacs, they are typical values for any oak aged alcoholic beverage.

Through the process of the present invention, alcoholic beverages can be produced in approximately 30 days having levels of oxidation/ethoxylation reaction products, such as gallic acid, vanillic acid, and vanillin, for example, substantially equivalent to the amounts of these compounds found in commercial products aged for approximately 12 years in oak. This is believed to be due to the accelerated pace of the maturation chemistry which is obtained in the process of the present invention.

The levels of those congeners which are oxidation/ethoxylation reaction products of extracts found in the products of the present invention, produced in a matter of days or weeks, can be equivalent to or greater than the levels of the same congeners found in alcoholic beverages which have been aged through years of storage in oaken barrels. For example, products produced by the process of the present invention can have ellagic acid levels greater than about 20 mg/L, gallic acid levels greater than about 15 mg/L, vanillin levels greater than about 4.0 mg/L, syringaldehyde levels greater than about 8.0 mg/L, vanillic acid greater than about 2.0 mg/L, and syringic acid greater than about 3.0 mg/L. These are levels of congeners which would be typical of alcoholic beverages aged for three years or more in wooden barrels. In some embodiments the levels of these congeners in the products of the present invention are equivalent to or greater than the levels of the same congeners found in similar beverages aged for five years or more in wooden barrels.

In one embodiment, the alcoholic beverages produced by the present invention can have vanillin levels between about 5.0 and about 7.5 mg/L, and can have syringaldehyde levels between about 7.0 and about 15.0 mg/L.

Free radicals are positively charged ions found in all alcoholic beverages, and are most likely due to the polar fractions from higher alcohols and unstable esters (less likely are nitrogen fragments and organo-metallics). Free radicals are an important measure of the "completeness" of post-distillation aging. In general, fewer free radicals indicates a more properly finished product. The quantity of all radicals found in distillates processed according to the present invention will generally be less than that found in similar commercial aged products, suggesting that the process of the present invention can yield a more thorough, tightly controlled maturation than can years of barrel aging. For example, in one embodiment, the product produced according to the process of the present invention can have about 70% fewer free radicals than a similar product which has been subjected to a slower barrel aging process.

The present invention may be better understood with respect to the following examples.

EXAMPLE 1

A test program was set up to compare the addition of varying levels and types of wood particles to unaged 80 proof corn whiskey and rum followed by subjection to varying energy levels of ultrasound in combination with various sugar catalysts. The mixtures were filtered through fibers, both alone and in the presence of activated charcoal and/or diatomaceous earths. Some finished specimens had flavor additions of common flavors and fragrances, such citrus, vanilla, pecan, walnut, etc. combined with the mixtures and subjected to additional ultrasonic energy.

All specimens tested showed varying degrees of improvement. Those described below are typical of one possible embodiment of the invention.

Equal 6 ounce 80 proof unaged corn whiskey samples (commercially available Georgia Moon) were measured into 500 milliliter(ml) jars, to which was added 15 ml plain and toasted white oak wood dust and 30 ml plain maple wood dust. Each sample was then placed in a commercial ultrasound machine with water up to the neck of the container and treated with ultrasonic energy. Samples were removed every five minutes, with the last being removed 50 minutes after start.

The treated samples were filtered through paper and gold metal mesh and rated according to subjective criteria as listed below in Table 1 (scale of 1 to 10 with 10 being the best) against a standard sour mash bourbon (Jim Beam) that had been aged for four years. Taste was compared for both the straight samples at 80 proof and samples blended with water to 40 proof.

TABLE 1

| Sample | Color | Clarity | Aroma | Taste, 80 Proof | Taste, 40 Proof |
|---|---|---|---|---|---|
| 10 min | 10 | 9 | 8 | 7 | 8 |
| 50 min | 10 | 9.5 | 9 | 9 | 10 |
| Jim Beam | 8 | 10 | 8 | 7.5 | 7 |

EXAMPLE 2

Two equal 14 ½ a ounce samples (A and B) were prepared by combining Georgia Moon (80 Proof) and Everclear (190 proof), blended to make 99 proof. The samples were then prefiltered in a sleeve filter containing activated carbon, and were then placed in an ultrasonic unit for two hours. Samples were removed, filtered through a paper and gold metal filter. Products were compared with Wild Turkey age 8 years (80 proof), as shown below in Table 2.

TABLE 2

| Sample | Color | Clarity | Aroma | Taste, 99 Proof | Taste, 50 Proof |
|---|---|---|---|---|---|
| A | 10 | 8 | 8 | 8 | 8 |
| B | 9 | 9 | 9 | 9 | 10 |
| Wild Turkey | 10 | 10 | 9 | 9 (80 Proof) | 7 (40 Proof) |

Flavor additives improved aroma and flavor to the 9 to 10 range for both the A and B samples.

EXAMPLE 3

The graph shown in FIG. 1 was produced using a combination of gas chromatography and mass spectrometry. The analysis tested raw distillate from a popular rum supplier (Cruzan), the commercial brand made from that distillate (aged two years), and the raw distillate 30 days after treatment with the process of the present invention. The test scanned for the presence of higher alcohols.

According to the results, and as can be seen with reference to FIG. 1, the rum produced by the process of the present invention contained 12.4% less methanol, 41.1% less propanol, 69.6% less isobutanol, and 29.7% less amyl alcohols, as compared to a similar, traditionally aged rum. Since ethanol is the overwhelming component in the scan, its peaks have been omitted for the sake of clarity. Also, the y-axis has been scaled to more clearly show abundance of trace components.

These results are believed to be accurate for other types of alcoholic beverages produced by the present invention as well. For example, alcoholic beverages produced by the process of the present invention can have at least about 10% less methanol, about 35% less propanol, and about 20% less amyl alcohols then similar types of beverages which have been aged for at least two years in wooden barrels. Amyl alcohols being defined for the purposes of this disclosure to be a mixture of isomeric alcohols. This effect is particularly noticeable for isobutanol; the present product can have about 50% or more less isobutanol than a similar alcoholic beverage which has not been matured via the present process.

While the phenolics tested above are not responsible alone for flavor, the graph does demonstrate the efficiency with which the process of the present invention both extracts key flavor components and converts these mostly acid compounds into smoother tasting esters with more neutral pH readings via oxidation/ethoxylation.

Figure 2:
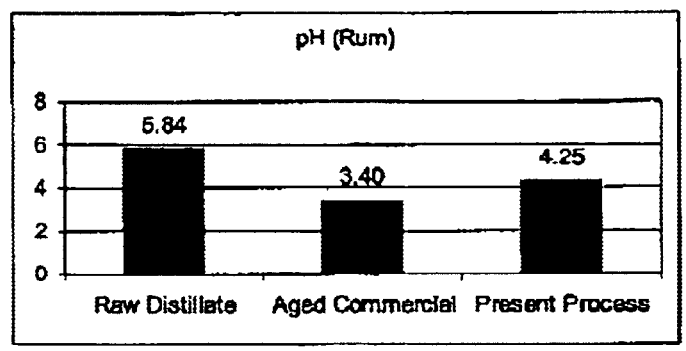
FIG. 2 illustrates pH data for the samples of FIG. 1.

The chart shown in FIG. 2, which shows pH data for the samples, supports this conclusion.

EXAMPLE 4

Figure 3:
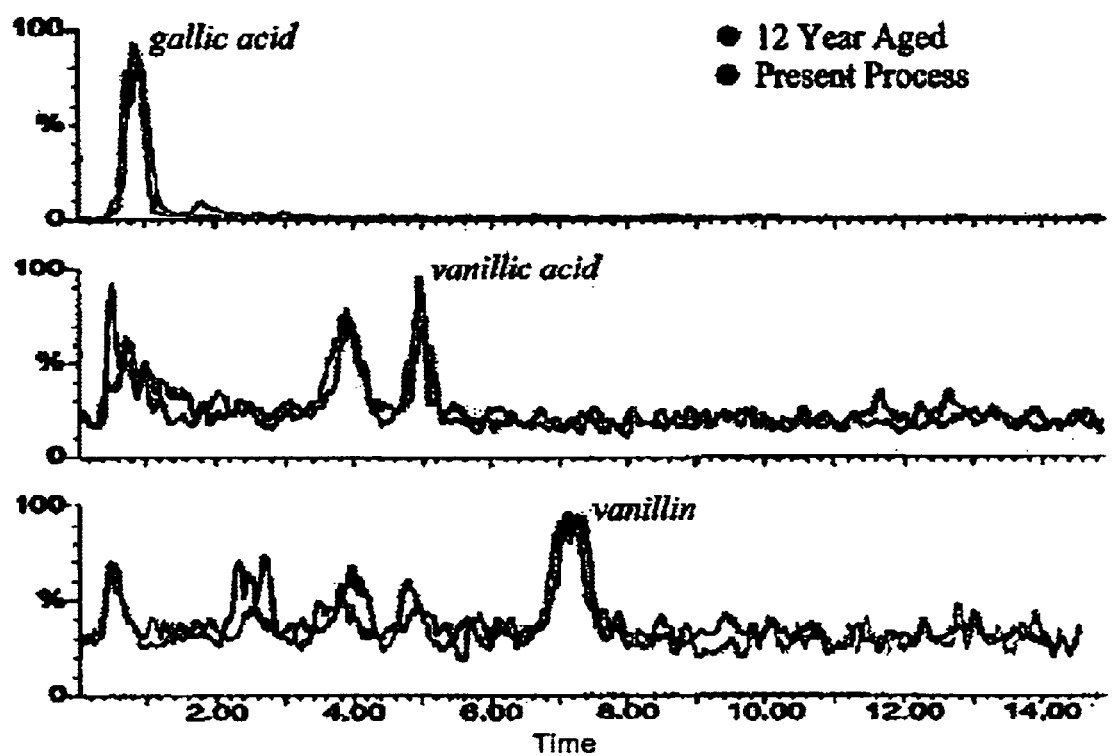
FIG. 3 graphically compares the presence of phenols in 12-year old single malt scotch and a 3-year old product treated according to the process of the present invention.

The graph shown in FIG. 3 compares the presence of phenols in a top-selling, 12-year old single-malt Scotch and a 3-year old product (the minimum age required to be called "Scotch Whisky") treated according to the process of the present invention. The graph also shows amounts of vanillin, formed from the esterification of vanillic acid.

As can be seen with reference to FIG. 3, the curves are almost identical, even though one sample spent an additional nine years in a barrel. These samples were also submitted to professional tasters. The product produced by the present invention was rated superior in smoothness and flavor to the popular 12-year old single-malt.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed is:

1. A process for maturing alcoholic beverages comprising:
   providing a distilled consumable alcohol; and
   subjecting said consumable alcohol to ultrasonic energy at a power of at least 3 Watts/liter for at least one hour to accelerate chemical reactions in the consumable alcohol involved in maturation and flavor enhancement of said alcohol, wherein the temperature of the alcohol is maintained between 90° F. and 150° F. while the alcohol is being subjected to the ultrasonic energy during the process.

2. A process as defined in claim 1, wherein said distilled consumable alcohol is between about 20 proof and about 190 proof alcohol content.

3. A process as defined in claim 1, wherein said distilled consumable alcohol is between about 80 proof and about 150 proof alcohol content.

4. A process as defined in claim 1, wherein said alcohol is recirculated through a reaction vessel while being subjected to the ultrasonic energy.

5. A process as defined in claim 1, wherein the alcohol is subjected to ultrasonic energy at a power of at least about 5 Watts/liter.

6. A process as defined in claim 1, wherein the alcohol is subjected to ultrasonic energy at a power of between about 10 and about 80 Watts/liter.

7. A process as defined in claim 1, wherein said ultrasonic energy is at a frequency of greater than about 35,000 Hz.

8. A process as defined in claim 1, wherein said ultrasonic energy is at a frequency of between about 20,000 and about 170,000 Hz.

9. A process as defined in claim 1, further comprising combining said consumable alcohol with a purifying agent, said purifying agent being a material selected from the group consisting of activated carbon, diatomaceous earth, a filter, and mixtures thereof.

10. The process of claim 9, wherein the filter has an average pore diameter of less than about 5 μm.

11. A process as defined in claim 1, wherein said consumable alcohol is subjected to the ultrasonic energy for between about 12 and about 36 hours.

12. The process of claim 1 further comprising contacting the consumable alcohol with at least one flavorant.

13. The process of claim 12, wherein said flavorant is a solid.

14. The process of claim 13, further comprising filtering said solid from said mixture following subjection of said alcohol to said ultrasonic energy.

15. The process of claim 14, further comprising subjecting the alcohol to additional ultrasonic energy after filtering the solid from the alcohol.

16. The process of claim 12, wherein said flavorant is an extract.

17. The process of claim 12, wherein said flavorant is selected from the group consisting of wood, seeds, fruitwoods, nuts, fruits, plants, vegetables, and mixtures thereof.

18. The process of claim 12, wherein the alcohol is contacted with the flavorant prior to subjecting the alcohol to ultrasonic energy.

19. The process of claim 12, wherein the alcohol is contacted with the flavorant after subjecting the alcohol to ultrasonic energy.

20. The process of claim 19, further comprising contacting the alcohol and flavorant mixture to additional ultrasonic energy.

21. The process of claim 20, wherein the mixture is subjected to the additional ultrasonic energy for a period of time of between about 2 hours and about 4 hours.

22. A process for maturing a grain alcohol comprising:
providing a grain alcohol;
combining the grain alcohol with a catalyst to form a mixture; and
subjecting the mixture to ultrasonic energy at a power of at least 3 Watts/liter for at least one hour to accelerate chemical reactions involved in maturation and flavor enhancement in the grain alcohol, wherein the temperature of the mixture is maintained between 90° F. and 150° F. while the mixture is being subjected to the ultrasonic energy during the process.

23. A process as defined in claim 22, wherein the mixture is recirculated through a reaction vessel while being subjected to the ultrasonic energy.

24. A process as defined in claim 22, wherein the mixture is subjected to ultrasonic energy at a power of at least about 5 Watts/liter.

25. A process as defined in claim 22, wherein the mixture is subjected to ultrasonic energy at a power of between about 10 and about 80 Watts/liter.

26. A process as defined in claim 22, wherein the ultrasonic energy is at a frequency of greater than about 35,000 Hz.

27. A process as defined in claim 22, wherein the ultrasonic energy is at a frequency of between about 20,000 and about 170,000 Hz.

28. A process as defined in claim 22, wherein the mixture is subjected to the ultrasonic energy for between about 12 and about 36 hours.

29. A process as defined in claim 22, wherein the catalyst selected from the group consisting of sugars, esters, organic acids, wood extracts, and mixtures thereof.

30. A process for maturing alcoholic beverages comprising:
providing a consumable alcohol feedstock between about 20 and about 190 proof;
recirculating the alcohol through a reaction vessel; and
subjecting the alcohol to ultrasonic energy while the alcohol is in the reaction vessel, the alcohol being subjected to ultrasonic energy in an amount of at least 3 Watts per liter for at least one hour, said ultrasonic energy being at a frequency of between about 35,000 Hz and about 170,000 Hz, wherein the temperature of the alcohol is maintained between 90° F. and 150° F. while the alcohol is being subjected to the ultrasonic energy during the process.

31. The process of claim 30, further comprising contacting the alcohol with a purifying agent selected from the group consisting of activated carbon, diatomaceous earth, a filter having an average pore diameter of less than about 5 μm, and mixtures thereof.

32. The process of claim 30, wherein the temperature of the alcohol is maintained at a temperature of between 90° F. and about 120° F. while being subjected to the ultrasonic energy during the process.

33. The process of claim 30, wherein the alcohol is subjected to ultrasonic energy at a frequency of about 80,000 Hz.

34. The process of claim 30, wherein the alcohol is subjected to ultrasonic energy for between about 12 and about 36 hours.

35. The process of claim 30, wherein the alcohol is subjected to ultrasonic energy in an amount of between about 15 Watts/liter and about 40 Watts/liter.

36. The process of claim 30 further comprising contacting the consumable alcohol with at least one flavorant.

37. The process of claim 36, wherein said flavorant is a solid.

38. The process of claim 37, further comprising filtering said solid from said mixture following subjection of said alcohol to said ultrasonic energy.

39. The process of claim 38, further comprising subjecting the alcohol to additional ultrasonic energy after filtering the solid from the alcohol.

40. The process of claim 36, wherein said flavorant is an extract.

41. The process of claim 36, wherein said flavorant is selected from the group consisting of wood, seeds, fruitwoods, nuts, fruits, plants, vegetables, and mixtures thereof.

42. The process of claim 36, wherein the alcohol is contacted with the flavorant prior to subjecting the alcohol to ultrasonic energy.

43. The process of claim 36, wherein the alcohol is contacted with the flavorant after subjecting the alcohol to ultrasonic energy.

44. The process of claim 43, further comprising contacting the alcohol and flavorant mixture to additional ultrasonic energy.

45. The process of claim 44, wherein the mixture is subjected to the additional ultrasonic energy for a period of time of less than about 4 hours.

* * * * *